(12) United States Patent
Masen et al.

(10) Patent No.: US 7,104,460 B2
(45) Date of Patent: Sep. 12, 2006

(54) METHOD AND CONTROLLER FOR DETERMINING CARBON DIOXIDE EMISSIONS FROM A RECIRCULATING AIR HEATER

(75) Inventors: Mark Geoffrey Masen, Royal Oak, MI (US); David Ray Sundberg, Grapevine, TX (US); John James Schlachter, Waterford, MI (US); Frank Phillip Mimick, Watauga, TX (US)

(73) Assignee: Maxitrol Company, Southfield, MI (US)

( * ) Notice: Subject to any disclaimer, the term of this patent is extended or adjusted under 35 U.S.C. 154(b) by 0 days.

(21) Appl. No.: 10/903,575

(22) Filed: Jul. 30, 2004

(65) Prior Publication Data

US 2006/0118646 A1    Jun. 8, 2006

Related U.S. Application Data

(60) Provisional application No. 60/491,386, filed on Jul. 31, 2003.

(51) Int. Cl.
*F24H 3/02* (2006.01)
*F23N 5/18* (2006.01)

(52) U.S. Cl. .................. 236/11; 236/15 E; 431/12; 431/76

(58) Field of Classification Search .............. 236/10, 236/11, 15 BR, 15 BD, 15 E, 26 A, 49.3, 236/91 R, 91 F; 431/12, 14, 75, 76; 700/274; 702/100
See application file for complete search history.

(56) References Cited

U.S. PATENT DOCUMENTS

| | | | |
|---|---|---|---|
| 4,059,385 A | | 11/1977 | Gulitz et al. |
| 4,360,336 A | * | 11/1982 | Shepherd .................. 236/15 E |
| 4,396,369 A | * | 8/1983 | Kaessmann ............... 236/15 E |
| 4,408,569 A | * | 10/1983 | Novak .................... 236/15 BD |
| 4,549,080 A | | 10/1985 | Baskins et al. |
| 4,913,647 A | | 4/1990 | Bonne et al. |
| 5,112,217 A | | 5/1992 | Ripka et al. |
| 5,310,335 A | * | 5/1994 | van Berkum ................ 431/76 |
| 5,599,179 A | | 2/1997 | Lindner et al. |
| 5,997,278 A | * | 12/1999 | Sutton ...................... 236/15 E |
| 6,190,160 B1 | * | 2/2001 | Hibon et al. ................ 431/76 |
| 6,389,330 B1 | | 5/2002 | Khesin |
| 6,431,457 B1 | | 8/2002 | Dirkes, II |
| 6,522,994 B1 | | 2/2003 | Lang |
| 6,560,563 B1 | | 5/2003 | Lang |
| 6,691,054 B1 | | 2/2004 | Lang |

* cited by examiner

*Primary Examiner*—Harry B. Tanner
(74) *Attorney, Agent, or Firm*—Howard & Howard

(57) ABSTRACT

A method of determining the amount of air flowing through an outside air damper of a recirculating air heater includes the steps of sensing an amount of airflow flowing through the damper, recording the amount of airflow and a damper position value at a plurality of damper positions, and interpolating a curve relating the amount of airflow to the damper position for all damper positions between a minimum damper position and a maximum damper position. Once the amount of air flowing through the outside air damper is determined from a position on the curve, the concentration of carbon dioxide ($CO_2$) within a building space can be calculated and/or determined to be within acceptable limits.

10 Claims, 4 Drawing Sheets

METHOD AND CONTROLLER FOR DETERMINING CARBON DIOXIDE EMISSIONS FROM A RECIRCULATING AIR HEATER

CROSS-REFERENCES TO RELATED APPLICATIONS

This application claims the benefit of U.S. Provisional Application No. 60/491,386, filed Jul. 31, 2003.

BACKGROUND OF THE INVENTION

1. Field of the Invention

This invention relates to methods and controllers that monitor and limit concentration of carbon dioxide emitted by air heaters in an enclosed space, and, in particular, a manner of measuring and controlling the concentration to provide accurate data to the controller to maintain or limit proper levels of carbon dioxide concentration in a building space without use of expensive carbon dioxide monitors.

2. Description of the Related Art

The National Standard for Direct Fired Recirculating Industrial Air Heaters (ANSI Z83.18) sets standards for the concentration of carbon dioxide ($CO_2$) that is permitted to be emitted from a recirculating direct gas-fired modulating air heater in an enclosed space. Related art systems typically use a $CO_2$ sensor to determine the amount of $CO_2$ that is being emitted by the air heater in an enclosed space. However, this approach is often problematic, as the accuracy of the sensor can be affected by the altitude, humidity, and location of the sensor, thus providing an inaccurate concentration of $CO_2$ emitted from the heater in any enclosed space.

U.S. Pat. No. 6,431,457 (the '457 patent) discloses an air heater control system that controls temperature rise through a burner to limit the concentration of $CO_2$ without the use of a $CO_2$ sensor. Temperature rise through the burner is limited by the formula $\Delta T = \text{Actual \% OA} * P_{max}/19.63/k$, where $\Delta T$ is the temperature rise, Actual % OA is the actual proportion of outside air that is brought through the burner, $P_{max}$ is the allowable concentration of $CO_2$ in parts per million, and k is a factor based on the type of fuel burned by the burner.

There remains an opportunity to provide a method of determining a concentration of $CO_2$ without the use of expensive $CO_2$ sensors and without knowing the actual proportion of outside air that is brought through the burner.

BRIEF SUMMARY OF THE INVENTION AND ADVANTAGES

The subject invention provides a method of determining the amount of air flowing through a damper of an air heater. The method includes the steps of sensing an amount of airflow flowing through the damper, recording the amount of airflow and a damper position value at a plurality of damper positions, and interpolating a curve relating the amount of airflow to the damper position for all damper positions between a minimum damper position and a maximum damper position.

The subject invention also provides a method of determining or measuring a concentration C of carbon dioxide ($CO_2$) in air discharged from a furnace having a burner. The method includes the steps of determining a temperature difference $\Delta T$ between a supply air temperature $T_S$ of air before the burner and discharge air temperature $T_D$ of air after the burner. The method continues by determining an amount of outside air flowing through an outside air damper of the furnace, calculating a proportion P of outside air brought through the burner, and receiving a factor K based on a type of fuel used in the furnace. The method then determines the concentration C of $CO_2$ with an equation utilizing the temperature difference $\Delta T$, the factor K, and the calculated proportion P of outside air brought through the burner.

Accordingly, the subject invention provides a method for determining an amount of air flowing through an outside air damper, which can then be used to calculate the concentration of $CO_2$ that is discharged by a recirculating air heater.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
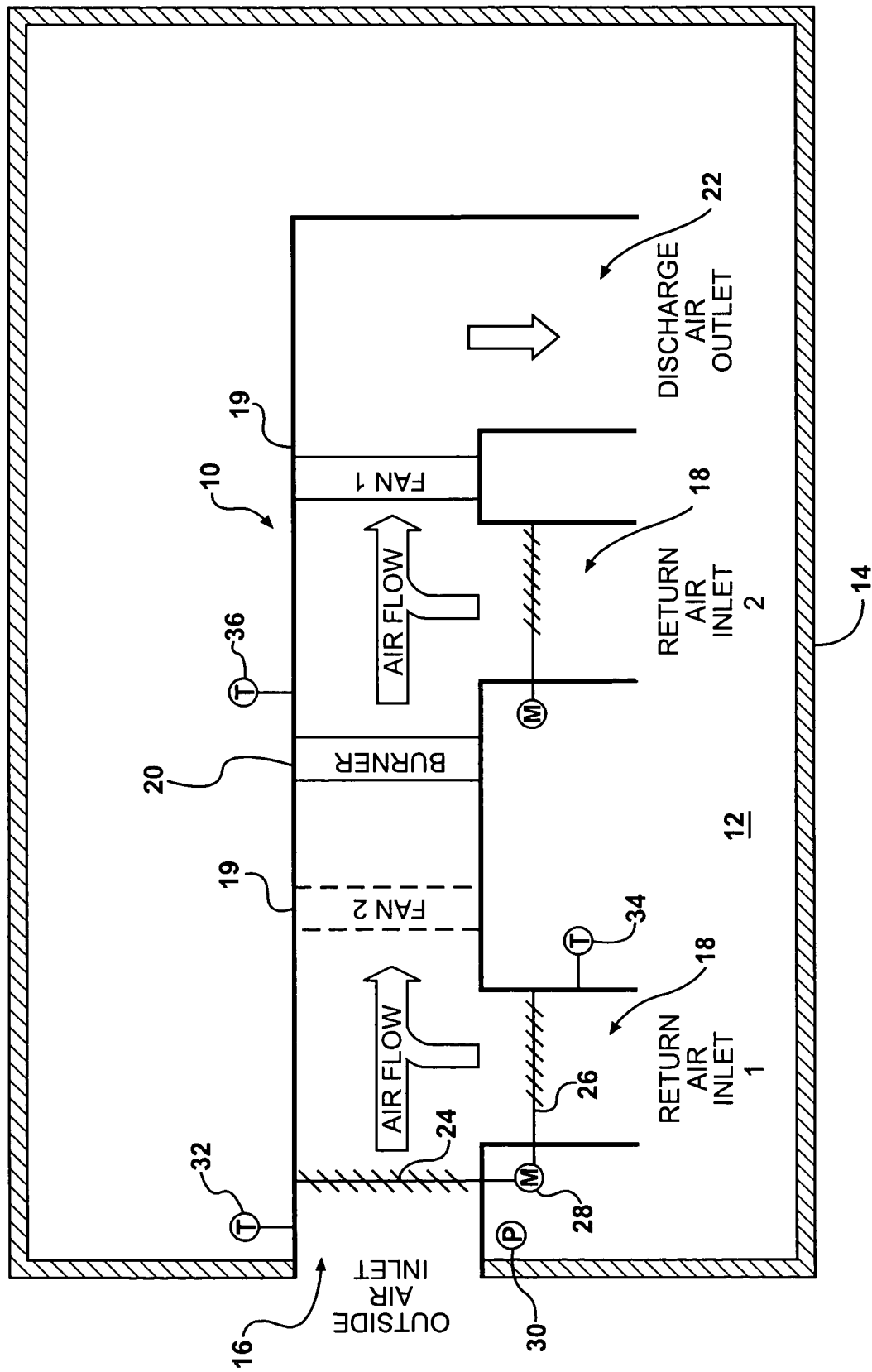
FIG. 1 is block diagram showing a typical recirculating direct gas-fired modulating heater in an enclosed space or confined area.

Referring to the Figures, wherein like numerals indicate like or corresponding parts throughout the several views, and starting with FIG. 1, a method and controller to monitor and limit a concentration C of carbon dioxide ($CO_2$) emissions from a recirculating direct gas-fired modulating air heater 10 is shown in an enclosure or otherwise confined air space 12. The confined air space 12 typically comprises a room or rooms in an enclosure 14, such as a building.

Heaters 10 of this type typically include at least one outside air inlet 16 and at least one return air inlet 18. The outside air inlet 16 draws fresh, outside air from outside the confined air space 12, usually from outside the entire building. The return air inlet 18 draws recirculated air from within the confined air space 12 inside the enclosure 14. The outside air and recirculated air are combined and referred to as supply air. At least one fan 19 draw or push the supply air through a burner 20 to be warmed.

After passing through the burner 20, the now heated supply air is referred to as discharge air. The discharge air is forced out of the heater 10 through a discharge air outlet 22 and into the confined air space 12 of the enclosure 14. In some heater 10 configurations, the discharge air is combined with recirculated air from within the confined air space 12 before being forced out of the heater 10 into the confined air space 12.

The heater 10 also typically includes an outside air damper 24 and a recirculating air damper 26. The dampers 24, 26 are inversely interlocked so that when the outside air damper 24 is at its maximum open position, the recirculating air damper 26 will be at its minimum open position, and vice-versa. For example, when the outside air damper 24 is 40% open, the recirculating air damper 26 will be 60% open. A motor 28 is usually used to actuate the dampers 24, 26. Typically, an air damper position sensor 30 is operatively connected to the outside air damper 24 for sensing a position of the outside air damper 24. However, the air damper position sensor 30 may alternatively be operatively connected to the recirculating air damper 26 for sensing the position of the recirculating air damper 26.

The heater 10 typically includes three temperature sensors. The first is an outside air temperature sensor 32 for sensing outside air temperature $T_O$. Second, a return air temperature sensor 34 senses the return air temperature $T_R$. The third sensor is a discharge air temperature sensor 36 that measures the discharge air temperature $T_D$.

Figure 2:
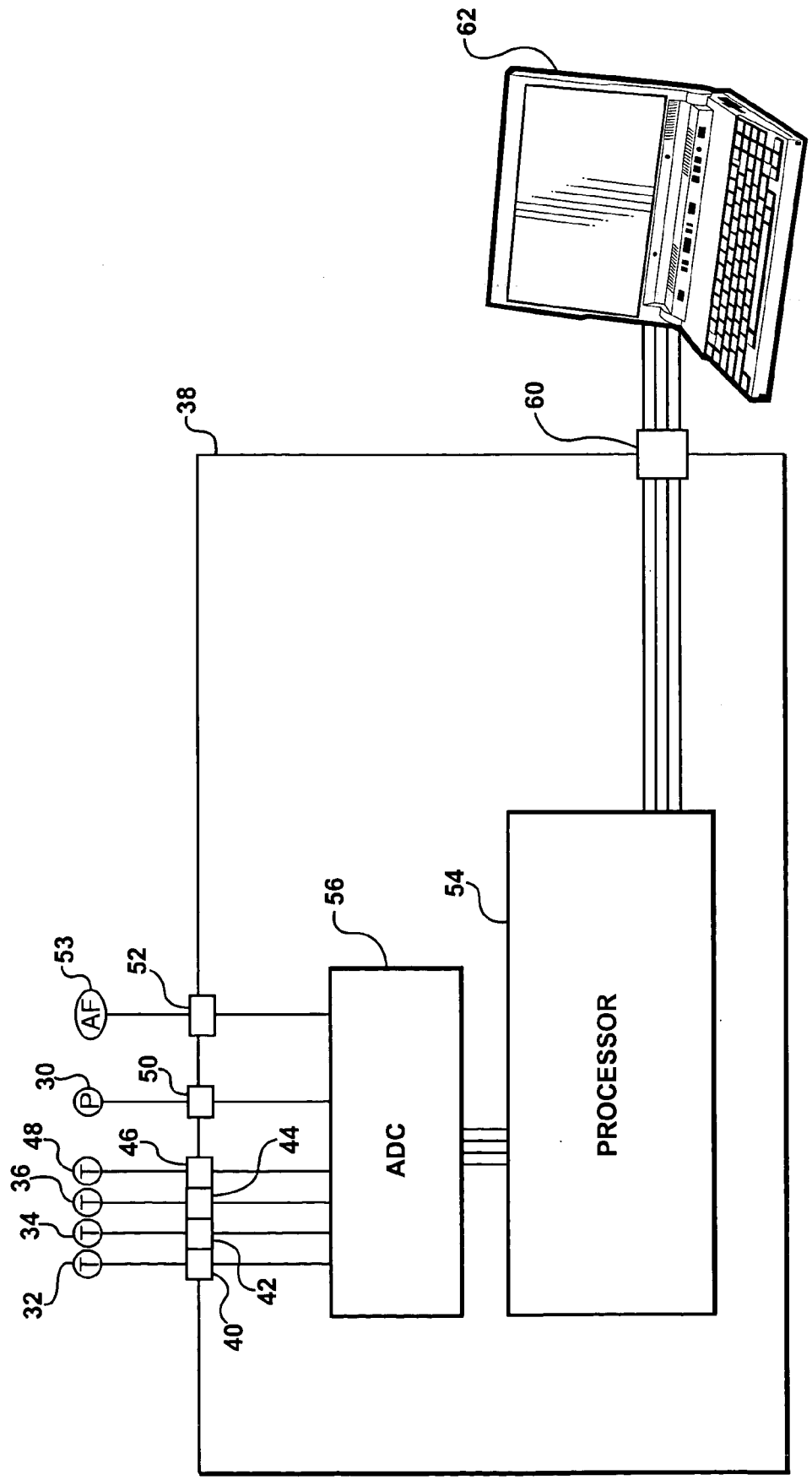
FIG. 2 is a block diagram showing a controller used for monitoring and controlling the heater.

Referring now to FIG. 2, the preferred embodiment of the subject invention includes a controller 38. The controller 38 includes an outside air temperature port 40, a return air temperature port 42, and a discharge air temperature port 44. The ports 40, 42, 44 interface with their respective temperature sensors 32, 34, 36. Additionally, the controller 38 includes an air space temperature port 46 for connecting an air space temperature sensor 46 that monitors the temperature of the confined air space 12.

The controller 38 also includes a damper position feedback port 50 for interfacing with the air damper sensor 24. An airflow measuring device port 52 is also preferably included with the controller 38 and operatively connected to an airflow measuring sensor 53. The use of the airflow measuring sensor 53 will be described in detail below.

The controller 38 further preferably includes a processor 54 and an analog-to-digital converter (ADC) 56. Typical sensors used in industry produce analog signals representing the particular property being measured. The ADC 56 is operatively connected to the various ports 40, 42, 44, 46, 50, 52 for converting the analog signals generated by the sensors 30, 32, 34, 36, 48, 53 to digital signals. The processor 54 is electrically connected to the ADC 56 for receiving these digital signals. However, those skilled in the art realize that sensors may alternatively produce digital signals that need not be conditioned using the ADC 56.

The concentration C of $CO_2$ emissions from the heater may be computed without the use of complicated and expensive air analyzing sensors. The National Standard for Direct Fired Recirculating Industrial Air Heaters (ANSI Z83.18) shows that the concentration C of $CO_2$ can be calculated using the following equation:

$$C = \frac{19.63 \cdot K \cdot \Delta T}{P}$$

where K is a factor of a particular type of fuel burned by the burner 20, P is the proportion of outside air brought through the burner 20, and $\Delta T$ is the temperature rise. K factors for any particular fuel are known to a person of ordinary skill in the art or are easily obtainable by a user of the heater 10. For example, K is 1.04 for natural gas and 1.206 for liquid petroleum gas (LPG), commonly known as propane. Temperature rise $\Delta T$ is defined as the difference between the discharge air temperature $T_D$ and a supply air temperature $T_S$.

In order to calculate the concentration C, the proportion of outside air P must be determined. The supply air temperature $T_S$ can then be determined by mathematically combining the outside air and recirculated air temperatures $T_O$, $T_R$ using the equation $$T_S = (T_O \cdot P \cdot 0.01) + (T_R \cdot (100-P) \cdot 0.01)$$

where the proportion of outside air P is represented as a percentage.

The subject invention provides a method for determining the proportion of outside air P. This method is phrased in terms of the controller 38 and sensors 30, 32, 34, 36, 48, 53 connected to the controller 38 as previously mentioned. However, those skilled in the art realize that the method may be implemented without the use of the controller 38 and the sensors 30, 32, 34, 36, 48, 53 connected to the controller 38.

Figure 3:
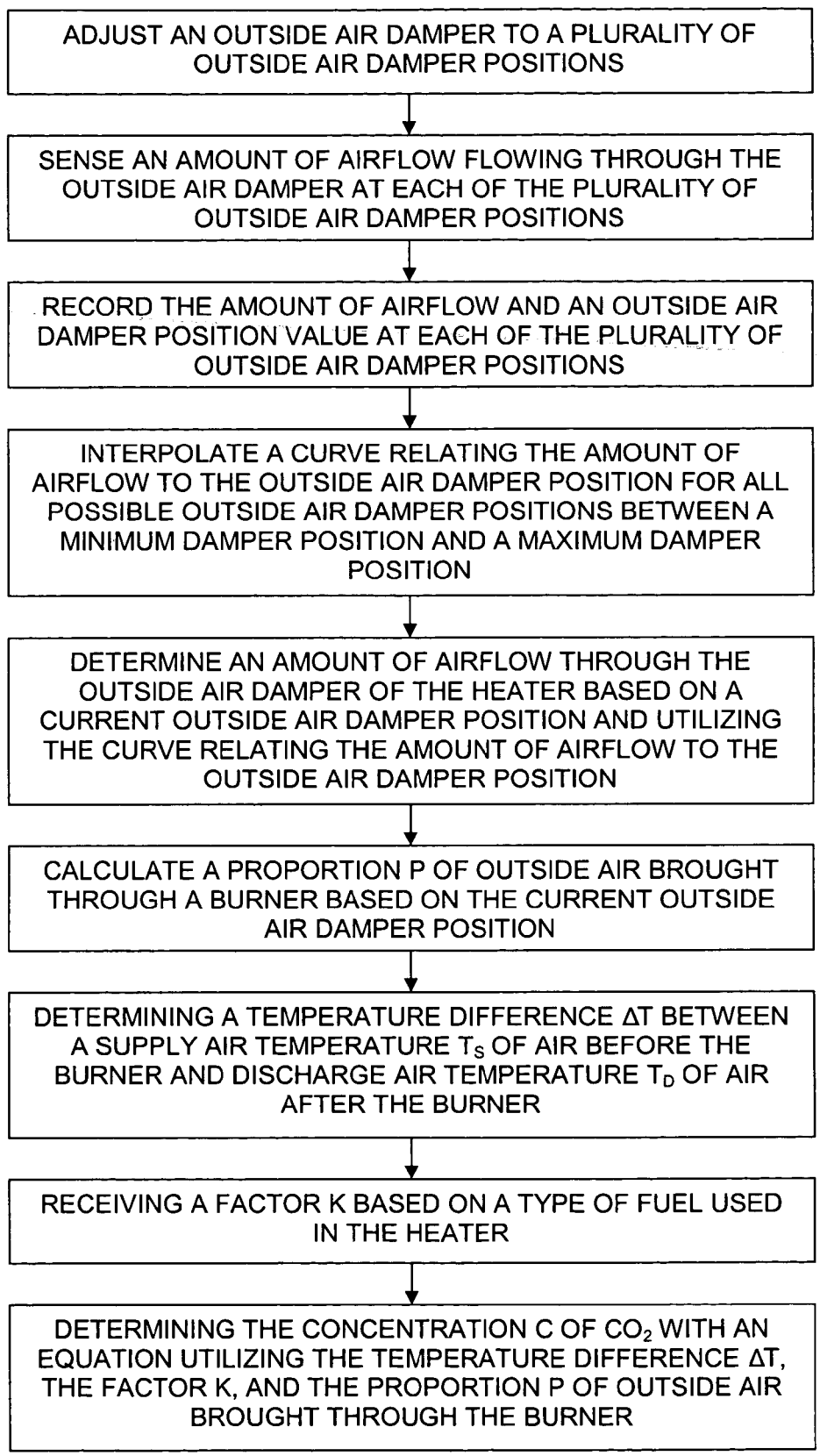
FIG. 3 is a flow chart diagram showing steps to generate a curve showing the correlation between damper position value and an amount of air flow.
Figure 4:
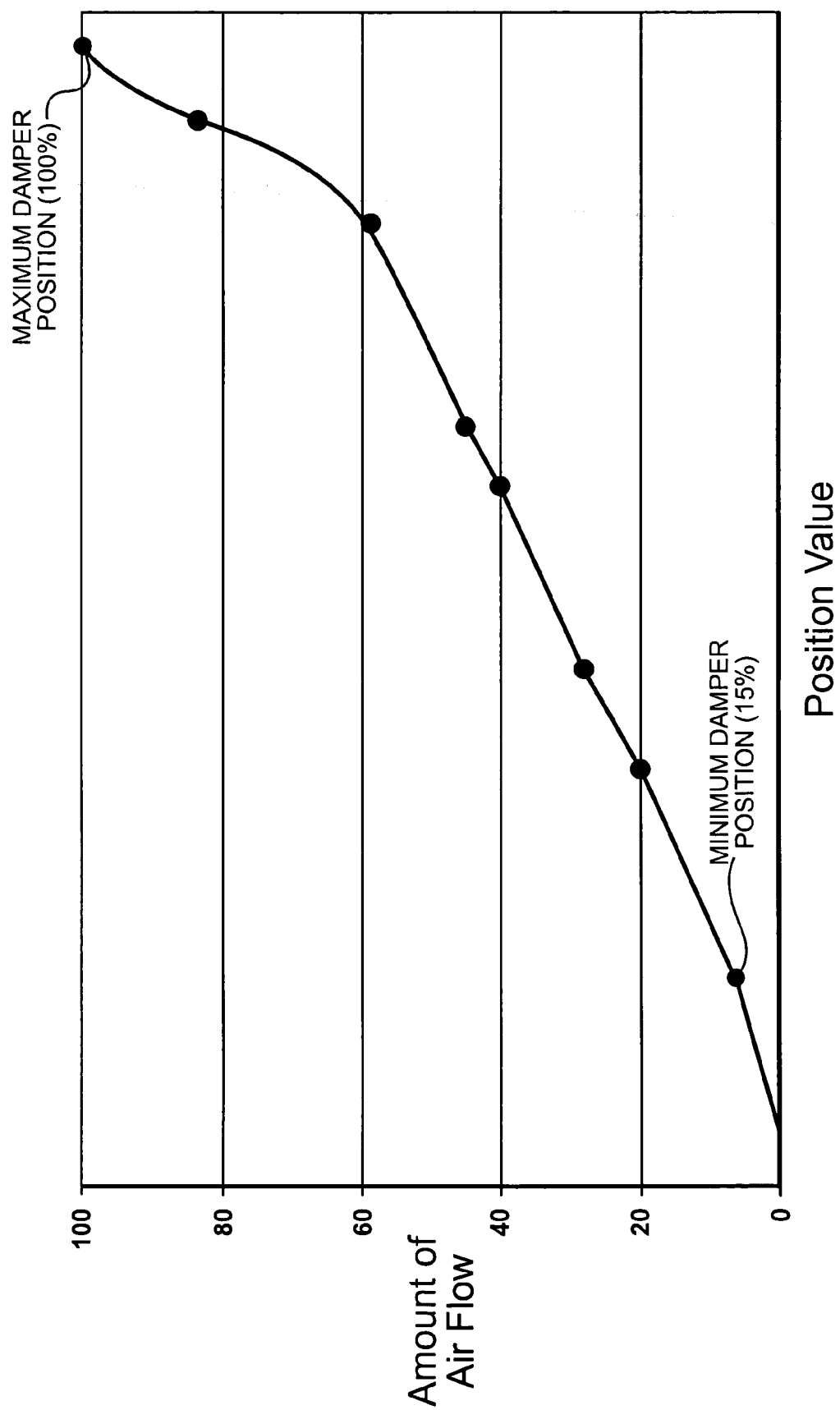
FIG. 4 is a graph showing an example of the curve.

Referring to FIG. 3, the method begins by the outside air damper 24 being adjusted to a minimum position. Typically, this minimum position is about 15% open. The minimum position is regularly not set less than 15% since the heater 10 cannot typically operate efficiently with very little or a complete lack of outside air. The controller 38 records an amount of airflow measured by the airflow measuring sensor 53 and a damper position value received from the air damper position sensor 30 at the minimum position. The outside air damper 24 is then adjusted to a maximum position, typically 100% open. At this position, all of the supply air is outside air since the recirculating air damper 26 is 0% open. The controller 38 then records the amount of airflow from the airflow measuring sensor 53 and the damper position value from the air damper position sensor 30 at the maximum position.

The outside air damper is then cycled between the maximum and minimum positions. The amount of airflow and the damper position value are also recorded at a plurality of outside air damper positions between the maximum and minimum positions. For example, the amount of airflow and damper position may be recorded at 5% open increments (20%, 25%, 30%, etc.). A curve relating the amount of airflow to damper position can then be interpolated using the recorded values and amounts. An example of such a curve is shown graphically in FIG. 3. Once the curve is interpolated, an amount of airflow can be determined for any damper position. The airflow measuring sensor 53 may be removed from the heater 10 and disconnected from the controller 38 once the curve has been generated.

The proportion P of outside air at any damper position can be easily determined. The calculated proportion P is found by dividing the amount of airflow at the current damper position by the amount of airflow at the maximum outside air position, and multiplying by 100. As set forth above, this calculated proportion P can then be used in the system and relate back to inform whomever needs to be informed that the carbon dioxide concentrations are within any limits defined as acceptable.

The controller 38 also includes a communications port 60 for connecting a user interface 62, such as a laptop computer, to the controller 38. The user interface 62 allows an operator to set parameters of the controller 38. These parameters include, but are not limited to, the particular gas used by the heater 10 and the minimum outside damper position.

Many modifications and variations of the present invention are possible in light of the above teachings. The invention may be practiced otherwise than as specifically described within the scope of the appended claims.

What is claimed is:

1. A method of determining a concentration C of carbon dioxide ($CO_2$) in air discharged from a recirculating air heater having a burner, an outside air damper, and a recirculating air damper inversely interlocked with the outside air damper, said method comprising the steps of:

adjusting the outside air damper to a plurality of outside air damper positions;

sensing an amount of airflow flowing through the outside air damper at each of the plurality of outside air damper positions;

recording the amount of airflow and an outside air damper position value at each of the plurality of outside air damper positions;

interpolating a curve relating the amount of airflow to the outside air damper position for all possible outside air damper positions between a minimum damper position and a maximum damper position;

determining an amount of airflow through the outside air damper of the heater based on a current outside air damper position and utilizing the curve relating the amount of airflow to the outside air damper position;

calculating a proportion P of outside air brought through the burner based on the current outside air damper position;

determining a temperature difference $\Delta T$ between a supply air temperature $T_S$ of air before the burner and discharge air temperature $T_D$ of air after the burner;

receiving a factor K based on a type of fuel used in the heater; and determining the concentration C of $CO_2$ with an equation utilizing the temperature difference $\Delta T$, the factor K, and the proportion P of outside air brought through the burner.

2. A method as set forth in claim 1 wherein said step of determining the concentration C of $CO_2$ with an equation utilizing the temperature difference $\Delta T$, the factor K, and the proportion P of outside air brought through the burner is further defined as the step of determining the concentration C or CO2 with the equation $C=(19.63 \times K \times \Delta T)/P$.

3. A method as set forth in claim 2 wherein the minimum damper position is further defined as about 15% open.

4. A method as set forth in claim 3 wherein the maximum damper position is further defined as about 100% open.

5. A method as set forth in claim 4 wherein the plurality of damper positions is further defined as being at about 5% increments between the minimum and maximum damper positions.

6. A method as set forth in claim 1 wherein the step of calculating a proportion P of outside air brought through the burner is further defined as dividing the amount of airflow at the current outside air damper position by the amount of airflow at the maximum damper position and multiplying by 100.

7. A method as set forth in claim 1 further comprising the step of calculating the supply air temperature $T_S$ using the equation $T_S=(T_O \cdot P \cdot 0.01)+(T_R \cdot (100-P) \cdot 0.01)$, where To is defined as the outside air temperature of air flowing through the outside air damper and $T_R$ is defined as the return air temperature of air flowing through a return air damper inversely interlocked with the outside air damper.

8. A controller for controlling and maintaining a concentration C of carbon dioxide ($CO_2$) in air discharged from a recirculating air heater having a burner, an outside air damper, and a recirculating air damper inversely interlocked with the outside air damper, said controller comprising:

an airflow measuring sensor for determining an amount of outside air flowing through the outside air damper;

a position sensor operatively connected to the outside air damper for sensing an outside air damper position of the outside air damper;

an outside air temperature sensor for sensing an outside air temperature $T_O$ of air flowing through the outside air damper;

a return air temperature sensor for sensing a return air temperature $T_R$ of air flowing through the recirculating air damper;

a discharge air temperature sensor for sensing a discharge air temperature TD of air flowing through the discharge air damper; and a processor electrically connected to said sensors for recording the amount of airflow through the outside air damper and the outside air damper position value at a plurality of outside air damper positions, interpolating a curve relating the amount of airflow to the outside air damper position for all possible outside air damper positions between a minimum damper position and a maximum damper position, determining an amount of airflow through the outside air damper based on a current outside air damper position and utilizing the curve, calculating a proportion P of outside air brought through the burner based on the current outside air damper position, calculating a supply air temperature $T_S$ utilizing the outside air temperature $T_O$, the return air temperature $T_R$, and the proportion P of outside air, determining a temperature difference $\Delta T$ between the supply air temperature $T_S$ and discharge air temperature $T_D$, receiving a factor K based on a type of fuel used in the heater, and determining the concentration C of $CO_2$ with an equation utilizing the temperature difference $\Delta T$, the factor K, and the proportion P of outside air brought through the burner.

9. A controller as set forth in claim 8 further comprising an analog-to-digital converter electrically connected to said sensors and said processor for converting analog signals generated by said sensors to digital signals usable by said processor.

10. A controller as set forth in claim 8 further comprising a communications port electrically connected to said processor for connecting a user interface to said controller.

* * * * *